Jan. 27, 1942.   G. T. MEYERS   2,271,271
APPARATUS FOR SHEARING MOLTEN GLASS
Filed April 26, 1939
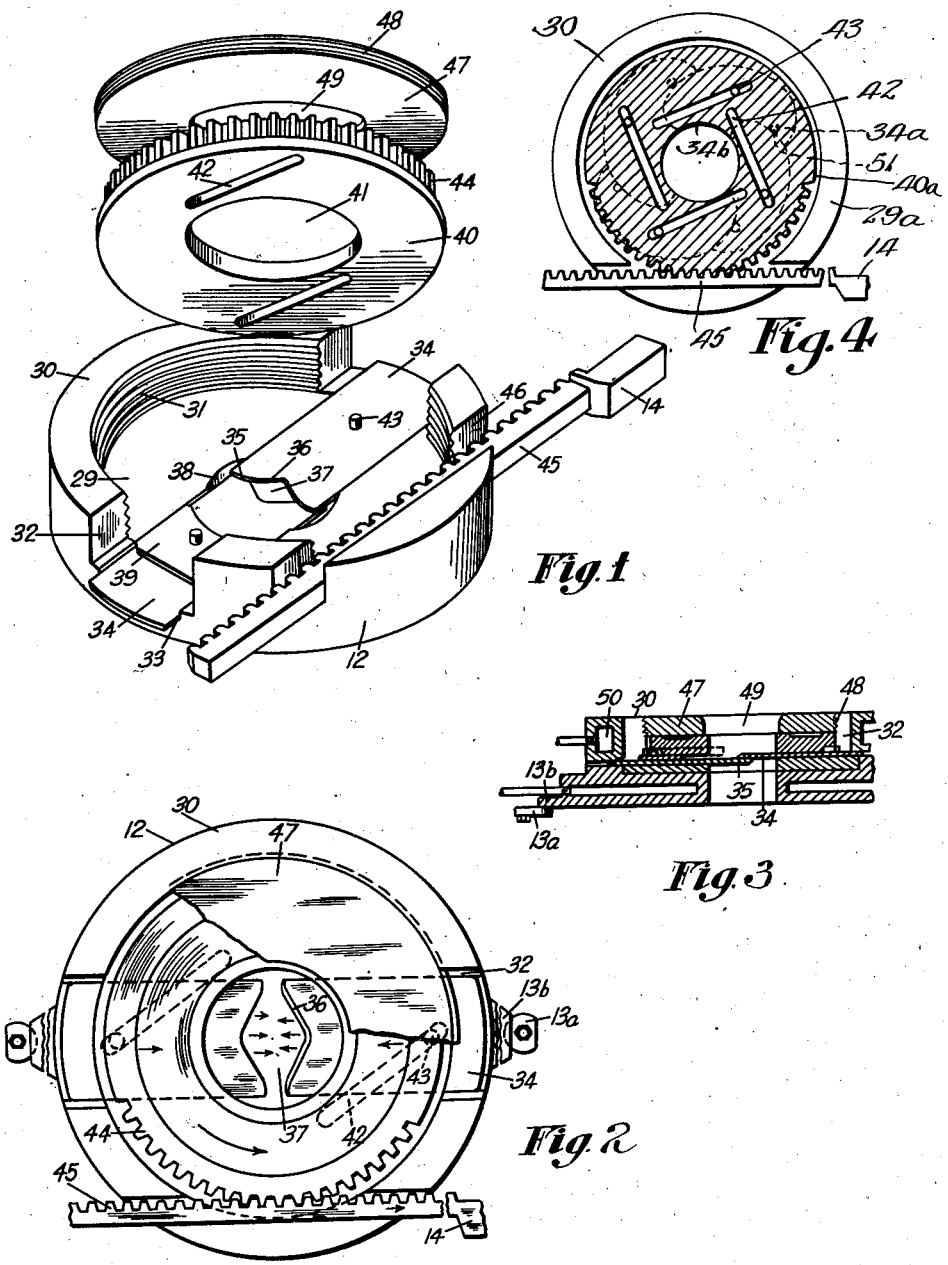
INVENTOR
George T. Meyers.
BY
ATTORNEYS Patented Jan. 27, 1942

2,271,271

UNITED STATES PATENT OFFICE 2,271,271

APPARATUS FOR SHEARING MOLTEN GLASS

George T. Meyers, Parkersburg, W. Va.

Application April 26, 1939, Serial No. 270,166

9 Claims. (Cl. 49—14)

My invention relates to an apparatus for shearing molten glass. It has to do, more particularly, with an apparatus for shearing molten glass into mold charges or gobs as it is being extruded from the forehearth or spout of a glass melting furnace.

One of the objects of my invention is to provide a novel shearing structure which is compact so that it may be placed in a relatively small space and is of such simple construction that very little difficulty will be encountered in keeping it in working condition.

Another object of my invention is to provide a shear structure which when it is operated will center the glass rather than deflect it to one side and, consequently, the charge will be centered relative to the mold as it drops therethrough.

Another object of my invention is to provide a shear structure having effective and simple operating means.

Many other objects and advantages will be apparent from the following description, drawing and the claims.

This application is directed to the shear structure disclosed in my application, Serial No. 78,431, filed May 7, 1936, which issued on May 4, 1937, as Patent No. 2,079,519. It is adapted to be used with glass feeding apparatus of the type disclosed in said patent.

The preferred embodiment of my invention is illustrated in the accompanying drawing wherein similar characters of reference designate corresponding parts and wherein:

Figure 1 is a perspective view of glass shears constructed according to my invention.

Figure 2 is a plan view, partly broken away, of a shear structure illustrated in Figure 1.

Figure 3 is a vertical sectional view taken through the shear structure illustrated in Figure 2.

Figure 4 is a horizontal sectional view taken through a modified form of my shears.

With reference to the drawing, and particularly to Figure 1, I illustrate my glass shear structure generally by the reference character 12. Because of the location of the shear structure, which is indicated in Figure 1, of my Patent No. 2,079,519, it is necessary that it be very compact. As disclosed in said patent the shear structure may be located within the tube extending from the spout orifice to the mold table and the shears can be operated from a point outside of the tube without having any large openings or slots in the tube for the operating connection, which might permit drafts to pass within the tube. My shear structure is operable by a single rod 14 which may extend through a small opening in the wall of the tube.

The shear structure 12 comprises a main disk-like supporting member 29 having an upstanding peripheral flange 30. This flange 30 has its inner surface threaded as at 31. At diametrically opposed points the flange 30 is cut away as at 32 and at the bottom of these cutaway portions 32 guideways 33 are provided for reciprocable shear blades 34. A pair of these shear blades 34 is provided and the inner ends of the blades overlap, as indicated at 35, at certain periods. The inner edge or cutting edge of each blade has a V-shaped notch 36 formed therein. When the blades 34 are in their outermost positions, an aperture or space 37 is formed through which a stream of glass may pass. A centrally disposed aperture 38 is provided in the body portion of member 29 for permitting passage of the stream of glass therethrough. A member 39 is provided on the upper surface of the lower shear blade and is of the same thickness as the shear blades. The member 40 will rest against this member 39 and also the top shear blade 34, both of these members being at the same level.

The annular member 40 is disposed within the flange 30 and above the blades 34 and is rotatable within the flange. This member 40 is provided with a central aperture 41 to permit passage of the stream of glass therethrough. It is further provided with a pair of slots 42. Each slot 42 receives a pin 43 mounted on one of the blades 34. The arrangement of the slots 42 is indicated best in Figure 2. From this figure it will be apparent that when the member 40 is rotated, the slots 42 will cooperate with the pins 43 to move the blades 34 inwardly and relative to each other, as indicated by the arrows in this figure. This is due to the fact that the slots are arranged chordal to the annular edge of member 40 and parallel with each other, as indicated, and when member 40 is rotated the pins 43 will be moved towards the center of member 40, and, consequently, the blades 34 will be moved inwardly. Thus, they will cut through the stream of glass passing through the aperture 37.

The member 40 is provided with gear teeth 44 along its periphery. These gear teeth 44 are adapted to mesh with a rack 45 which is disposed substantially tangential to the member 40. The rack 45 is formed on the outer end of the piston rod 14. It is slidably mounted in slots 46 formed in the flange 30 of member 29 at points directly opposite each other. A cap member 47 is provided with threads 48 on its periphery which cooperate with the threaded inner surface 31 of flange 30. This cap member 47 is adapted to be screwed into position within flange 31 so as to hold the member 40 and, consequently, the blade members 34 in position on the member 29. This cap member is provided with a centrally disposed aperture 49 to permit passage of the stream of glass therethrough. The entire shear structure fits within an annular water-jacket member 50, as illustrated in Figure 3, which serves to prevent overheating of the shear structure. The shear structure, including the water-jacket, is removably held in position merely by adjustable ears 13a, which may be secured to the spout, which cooperate with lugs 13b formed on member 50.

It will be noted that the shear structure is operated by a single member, viz., the rod 14. It will also be noted that this shear structure is very compact and, consequently, can be located within a limited space. It will also be noted that since the shear blades have V-shaped cutting edges and since they move through the glass from diametrically opposite points, they will tend to centralize the gobs of glass rather than deflect them to one side, which will cause the gobs to be centered relative to the molds.

In Figure 4 I illustrate a slightly different form of shear structure. The shear structure is operated by means of the piston rod 14 and rack 45 as before. The rack 45 meshes with gear teeth formed on the periphery of a member 40a which is quite similar to the member 40. In fact, it is the same as member 40 with the exception that it is provided with four slots 42 instead of two. These slots cooperate with pins 43, one of which is mounted on the upper surface of each of four shear blades 34a which are provided. Each shear blade 34a has one end pivoted as at 51 to a member 29a which is practically the same as member 29. The shear blades 34a are of substantially arcuate form, as indicated, and have cutting edges 34b on their inner edge adjacent their free ends. The slots 42 and pins 43 are so arranged that when the member 40a is rotated all of the blades 34a will be swung inwardly simultaneously towards the center of the member 29a. Consequently, the blades will cut through the stream of glass passing through the shear structure.

It will be noted that this shear structure is also very compact and is operated in the same manner as the other shear structure. Furthermore, it will be noted that because of the arrangement and movement of blades 34a, the gob which is sheared from the glass issuing through orifice 2 will be centered.

Other advantages will be apparent from the preceding description, the drawing and the following claims.

Having thus described my invention, what I claim is:

1. A shear structure comprising a socket member, said socket member comprising a disk-like portion having an upstanding peripheral flange, the interior of the flange being threaded, said flange having notches formed therein at diametrically opposed points, a pair of shear blades disposed on said disk-like portion of said socket member having their inner ends adjacent and their outer ends projecting through said notches, the inner end of each shear blade having a V-shaped cutting edge, a disk member disposed within said socket member and resting on said shear blades, said member being rotatable in the socket member and having slots which cooperate with pins on said blades to reciprocate the blades towards and from each other upon rotation thereof, said member having gear teeth on its periphery, an operating rack bar extending substantially tangential to said disk member through openings provided in said flange and engaging said gear teeth on said disk member, and a cap member threaded within the flange of said socket member for holding said disk member, shear blades and socket member in proper relationship, said cap, disk member and the disk-like portion of the socket member all having central apertures aligning with each other through which the glass will pass.

2. A shear structure comprising a socket member, said socket member comprising a disk-like portion having an up-standing peripheral flange, said flange having openings formed therein at diametrically opposed points, a pair of shear blades disposed on said disk-like portion of said socket member having their inner ends adjacent and their outer ends projecting through said openings, the inner end of each shear blade having a cutting edge, a disk member disposed within said socket member, said member being rotatable in the socket member, said disk member and said blades having interfitting portions which cooperate to reciprocate the blades towards and from each other upon rotation of said member, means for oscillating said member, and a cap member disposed within the flange of said socket member for holding said disk member, shear blades and socket member in proper relationship, said cap, disk member and the disk-like portion of the socket member all having central apertures aligning with each other through which the glass will pass.

3. A shear structure comprising a socket member, said socket member comprising a disk-like portion having an up-standing peripheral flange, said flange having openings formed therein at diametrically opposed points, a pair of shear blades disposed on said disk-like portion of said socket member having their inner ends adjacent and their outer ends projecting through said openings, the inner end of each shear blade having a cutting edge, a disk member disposed within said socket member, said member being rotatable in the socket member, said disk member and said blades having interfitting portions which cooperate to reciprocate the blades towards and from each other upon oscillation of said member, and means for oscillating said member, said means comprising a rack bar adapted to engage gear teeth formed on the periphery of said rotatable member, said rack bar being disposed tangential to said rotatable member and being reciprocably mounted in slots formed in said upstanding peripheral flange.

4. A shear structure comprising a socket member, said socket member comprising a disk-like portion having an up-standing peripheral flange, the interior of the flange being threaded, said disk-like portion having a central opening, a plurality of cooperating shear blades having one end pivoted to said disk-like portion adjacent said opening, the inner edge of each shear blade having a cutting edge, a disk member disposed within said socket member and resting on said shear blades, said member being rotatable in the socket member and having slots which cooperate with pins on said blades to move the blades relative to each other upon rotation thereof, said member having gear teeth on its periphery, an operating rack bar extending substantially tangential to said disk member through openings provided in said flange and engaging said gear teeth on said disk member, and a cap member threaded within the flange of said socket member for holding said disk member in position, said cap and disk member having central openings aligning with the central opening in the disk-like portion of said socket member.

5. A shear structure comprising a socket member, said socket member comprising a disk-like portion having an up-standing peripheral flange, said disk-like portion having a central opening, a plurality of cooperating shear blades having one end pivoted to said disk-like portion adjacent said opening, the inner edge of each shear blade having a cutting edge, a disk member disposed within said socket member, said member being rotatable in the socket member, said disk member and said blades having interfitting portions which cooperate to move the blades relative to each other upon rotation of said member, means for oscillating said member, and a cap member disposed within the flange of said socket member for holding said disk member in position, said cap and disk member having central openings aligning with the central opening in the disk-like portion of said socket member.

6. A shear structure comprising a socket member, said socket member comprising a disk-like portion having an upstanding peripheral flange, a plurality of shear blades disposed on said disk-like portions of said socket member, the inner portion of each shear blade having a cutting edge, a disk member disposed within said socket member, said member being rotatable in the socket member, said disk member and said blades having interfitting portions which will cooperate to move the blades towards and from each other upon rotation of said member, and means for oscillating said member, said means comprising a rack bar adapted to engage gear teeth formed on the periphery of said rotatable member, said rack bar being disposed tangential to said disk member and being reciprocably mounted in slots formed in said upstanding peripheral flange.

7. A shear structure comprising a socket member, said socket member comprising a disk-like portion having an upstanding peripheral flange, the interior of such flange being threaded, said disk-like portion having a central opening, a plurality of cooperating shear blades, means for supporting said shear blades in position with their inner edges adjacent said opening, the inner portion of each of said shear blades having a cutting edge, a disk member disposed within said socket member and resting upon said shear blades, said member being rotatable in the socket member and having slots which cooperate with pins on said blades to move the blades relative to each other upon rotation thereof, said member having gear teeth on its periphery, a reciprocably mounted operating rack bar extending tangential to said disk member through openings provided in said flange and engaging said gear teeth on said disk members, and a cap member threaded within the flange of said socket member for holding said disk member in position, said cap and disk member having central openings aligning with the central opening in the disk-like portion of said socket member.

8. A shear structure comprising a socket member, said socket member comprising a disk-like portion having an upstanding peripheral flange, said disk-like portion having a central opening, a plurality of cooperating shear blades each having one end pivoted to said disk-like portion adjacent said opening, the inner portion of each shear blade having a cutting edge, a disk member disposed within said socket member, said disk member being rotatable in the socket member, said disk member and said blades having interfitting portions which cooperate to move the blades relative to each other upon oscillation of said member, and means for oscillating said member, said means comprising a rack bar adapted to engage teeth formed on the periphery of said disk member, said rack bar being disposed tangential to said disk member and being reciprocably mounted in slots formed in said upstanding peripheral flange.

9. A shear structure comprising a socket member, said socket member comprising a disk-like portion having an upstanding peripheral flange, said disk-like portion having a central opening, a plurality of cooperating shear blades, means for supporting said shear blades in position with their inner edges adjacent said opening, the inner portion of each shear blade having a cutting edge, a disk member disposed within said socket member, said disk member being rotatable in the socket member, said disk member and said blades having interfitting portions which cooperate to move the blades relative to each other upon oscillation of said disk member, and means for oscillating said disk member, said means comprising a rack bar adapted to engage gear teeth formed on the periphery of said disk member, said rack bar being disposed tangential to said disk member and being reciprocably mounted in slots formed in said upstanding peripheral flange.

GEORGE T. MEYERS.